United States Patent Office 3,780,168
Patented Dec. 18, 1973

3,780,168
PROCESS FOR THE REGENERATION OF ALUMINUM OXIDE
Gerhard Käbisch and Wolfgang Kunkel, Rheinfelden, Baden, Germany, assignors to Deutsche Gold- und Silber-Scheideansalt vormals Roessler, Frankfurt, Germany
No Drawing. Filed July 7, 1971, Ser. No. 160,510
Claims priority, application Germany, July 23, 1970, P 20 36 553.1
Int. Cl. C01b 15/02; C01f 7/02
U.S. Cl. 423—588
13 Claims

ABSTRACT OF THE DISCLOSURE

Aluminum oxide which has been inactivated in the anthraquinone process for the production of hydrogen peroxide is regenerated by treating with an alkaline acting solution.

---

The present invention concerns a process for the regeneration of aluminum oxide which has become inactive by use in the so-called anthraquinone process for the production of hydrogen peroxide.

In the above identified process as is known an anthraquinone derivative (reaction carrier) is dissolved in a solvent and the thus obtained "working solution" is hydrogenated in the presence of a catalyst to the extent that about 50% the quinone is converted to the corresponding hydroquinone. In the subsequent oxidation step the hydroquinone solution is treated with an oxygen containing gas whereby the quinone is reformed while simultaneously hydrogen peroxide is formed. Usually the hydrogen peroxide is washed out of the organic phase with water. By returning the working solution to the hydrogenation step and repeating of the individual operations hydrogenation→oxidation→extraction a cyclic process is obtained in which in a practical manner hydrogen peroxide is synthesized from the gases hydrogen and oxygen (the oxygen being obtained from air) with the aid of the reaction carrier dissolved in the working solution.

Examples of suitable anthraquinone derivatives include alkyl anthraquinones such as 2-ethyl anthraquinone, 2-t-butyl-anthraquinone, 2-amyl anthraquinone, 2-butyl anthraquinone, 2-isopropyl anthraquinone, 2-sec. butyl anthraquinone, 2-sec. amyl anthraquinone, 1,3-diethyl anthraquinone, and 2,7-diethyl anthraquinone as well as tetrahydroanthraquinones such as 2-ethyl tetrahydroanthraquinone and 2-butyl tetrahydroanthraquinone, mixtures such as a mixture of isopropyl anthraquinone and sec. butyl anthraquinone, esters of anthraquinone carboxylic acids, hetero nuclear disubstituted alkyl anthraquinones, etc.

As solvents for the quinones aromatic solvents are normally used, preferably boiling in the boiling range 150–220, e.g. trimethyl benzenes, ethyl methyl benzenes, tetramethyl benzene, t-butyl benzene, t-butyl toluene, ethyl propyl benzene, 1,3-diethyl benzene, 1,4-diethyl benzene, isodurene, mixtures boiling at 200–220° C., or 158–186° C. or 205–320° C., dimethyl benzene, toluene, xylene, methylnaphthalene, etc.

As the hydroquinone solvent in the working solution there are preferably employed alkyl or aryl phosphates having 4 to 10 carbon atoms in each hydrocarbon group, e.g. trioctyl phosphate, triamyl phosphate, tri 2-ethylhexyl phosphate, diphenyl butyl phosphate, trihexyl phosphate, triheptyl phosphate, triisoamyl phosphate, trinonyl phosphate.

Other conventional hydroquinone solvents are also well known in the art, e.g. esters of cyclohexanol and methyl cyclohexanol, di-isobutylcarbinol, nonylalcohol.

The production of hydrogen peroxide according to the anthraquinone process in industrial plants can only take place economically if either the pictured individual operations are carried out so selectively and quantitatively that even in a cyclic operation carried out for a months no breakdown products are formed from the components of the working solution, or if processes are developed which make it possible to keep the working solution in a high state of purity.

Although the selectivity and yield in all individual operations have been successfully improved since the introduction of the anthraquinone process into large scale technology, it has not been possible to relinquish the purification steps installed in the cycle, to which the function is assigned of maintaining the purity of the working solution. In these purification steps for the working solution two groups of substances are added, namely active aluminum oxide (e.g. German Pat. 1,030,314) and sodium aluminum silicate (e.g. British Pat. 896,346). The substances of both groups fulfill many functions in the cycle for obtaining the state of purity of the working solution, as, among others, the adsorption of decomposition products which are formed from the solvents or the reaction carriers, the regeneration of by-products, formed from the reaction carrier, i.e. anthrones and epoxides of the tetrahydroanthraquinones and the regulation of the tetrahydroanthraquinone level in the working solution.

In many industrial plants aluminum oxide is used because it has advantages over sodium aluminum silicate, for example, the fact that it acts at lower temperatures, whereby the adsorption activity is increased, the formation of additional by-products is prevented and the safety is increased. The higher price of introduction of an aluminum oxide active at lower temperatures in comparison to sodium aluminum silicate is a disadvantage. There was no lack therefore of experiments to regenerate aluminum oxide which has become unusable, in order to reduce the production costs in the anthraquinone process by repeated use of this expensive consumed material.

Such regeneration processes for the reactivation of sodium aluminum silicate which have become inactive are already known. Thus according to German Pat. 1,259,309 a product which has become unusable can be regenerated by washing with solvents, evaporation at 130° C. and heating for 10 hours in an airstream at 400–450° C. According to another process sodium aluminum silicate which has become unusuable should either be regenerated by an oxidized, $H_2O_2$ containing working solution in the temperature range of 130–160° C. or by heating with aqueous $H_2O_2$ solution at 100° C. (German patent application 1,542,354, p. 3). From the known processes it can be calculated that such a regenerated product recovers maximally only 33% of the activity (in comparison to a fresh product). The known processes cannot be transferred to the regeneration of used aluminum oxide because the obtainable recovery of activity is still less than that given above and the processes, because of the extreme reaction conditions, lead to working solution losses during the regeneration.

It has now been found that aluminum oxide which has become inactive in the anthraquinone process can be regenerated in a simple manner, if it is, in a given case after the usual pretreatment, treated with alkaline acting solutions and then dried. In this manner, over 50% of the activity is recovered in relation to 100% being the activity of a fresh product. According to a preferred form of the invention an especially effective regeneration is obtained if active oxygen-containing substances are added to the alkaline solution used for the treatment of the invention. In a surprising manner not only a recovered activity of 100% is obtained but the regeneration process can be repeated successfully as often as desired. In contrast to the known processes the regeneration takes place at low temperatures whereby under easier conditions of operation working solutions losses and danger points are avoided.

For the operative carrying out of the process of the invention the tower containing the aluminum oxide which has become inactive is taken out of the cycle. Commonly the following operations are then carried out to recover the working solution:

(a) Draining the working solution.

(b) Washing the drained aluminum oxide with an organic solvent (for the most part quinone dissolvers of the working solution).

(c) Blowing out the oxide with steam.

Hereupon the treatment with alkaline solution follows, especially with addition of substances containing active oxygen.

The carrying out of this treatment can take place in special apparatus. More suitably, however, the aluminum oxide is left in the tower and the treatment carried out there. As alkaline acting solutions, for example, solution of alkali or alkaline earth metal hydroxides can be added, e.g. sodium hydroxide, potassium hydroxide, calcium hydroxide, barium hydroxide as well as other alkaline materials providing a pH above 8 preferably above 10. Examples of other alkaline materials include ammonium hydroxide. Preferably soda lye is used which concentration can range within wide limits depending on the further reaction conditions (for example temperature, time of treatment). Preferably NaOH solutions are used in concentrations of 0.1 to 3.0%, especially 0.2 to 0.7%. The time of treatment of the alkaline solutions can likewise vary within wide limits which are correlated to the other conditions of reaction. The standing time of the aluminum oxide in the cycle serves as the measure for the uppermost limit of the time of the treatment; that is, the regeneration should be stopped when the parallel aluminum oxide tower introduced into the cycle becomes inactive, so that a regular change is possible. Practically, however, the time of treatment is shortened to 1 to 10 days (preferably 2 to 4 days).

An advantage of the process of the invention is that a quantitative $Al_2O_3$ regeneration is made possible at temperatures below 100° C. Preferred are temperatures of 20 to 90° C., preferably between 40 and 90° C., especially between 50 and 80° C. As additives to the alkaline solution suitable substances are available containing peroxygen active oxygen such as sodium perborate, sodium percarbonate, potassium perborate, potassium percarbonate, sodium persulfate, potassium persulfate, percarbamide or hydrogen peroxide. The addition of peroxygen compounds should take place to the same extent as they are consumed. In the practical carrying out of the process it has been proven that the consumption of NaOH and $H_2O_2$ always lies below 0.1 kg./kg. $Al_2O_3$. According to the proper regeneration treatment, the water moist oxide must be dried before it can be added anew into the anthraquinone cycle. The carrying out of the washing and drying operation should in practice take place in such a way that the physical values of the regenerated oxide with regard to the loss on ignition and alkali content correspond closely to the values in fresh condition. The regenerated oxide then surprisingly also contains the same activity as a fresh product. In practice the drying can take place in such fashion that the oxide first is washed with water, until it has been adjusted to the desired alkali content, then dried until the desired loss on ignition appears. The most important physical data of fresh, used and regenerated aluminum oxide are compiled in Table 1 to which reference is made at times in the following examples. For characterization of the "activity" of the particular $Al_2O_3$ quality the "epoxide conversion" is referred to which represents the most exact measure for the activity because it combines two experimental values, namely the initial activity and the standing time (life period or durability) of the $Al_2O_3$. Such data are lacking in the previously known processes described in the state of art. As is known the main constituent of the regeneratable by products of the reaction carrier is the epoxide of the tetrahydroanthraquinone.

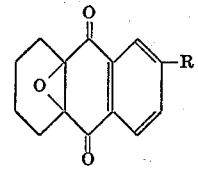

where R is alkyl as shown for the substituted anthraquinones mentioned supra, which content in the working solution is analytically easy to pursue. Under activity of a regeneration agent ($Al_2O_3$ or sodium aluminum silicate) is especially understood its capability of converting epoxide into quinone, namely at a long residence time of the regeneration agent in the cycle.

TABLE 1
[Properties of fresh, used and regenerated $Al_2O_3$]

| Detailed description in Example | $Al_2O_3$ quality | | | | |
| --- | --- | --- | --- | --- | --- |
| | 1 | 2 | 3 | 4 | 5 |
| | Fresh | Used up | Regenerated | Regenerated | Regenerated |
| | 1 | 1 | 2 | 3 | 4 |
| BET surface area, m.²/g | 320 | 160 | 210 | 323 | 313 |
| Loss on ignition 1 hour at 1,000° C., percent | 9.1 | 25.5 | 10.3 | 9.4 | 9.5 |
| Soluble $Na_2O$, g./kg | 4.1 | <0.1 | 3.5 | 3.6 | 5.2 |
| Carbon content, percent | 0 | 10.5 | 3.6 | 0.6 | 0.9 |
| Epoxide conversion, kg./kg. of $Al_2O_3$ | 1.08 | 0 | 0.8 | 1.2 | 1.1 |

Unless otherwise indicated all parts and percentages are by weight.

EXAMPLE 1

In a working solution containing 2-ethyl anthraquinone, 2-ethyl tetrahydroanthraquinone and epoxide in a mixture of aromatic hydrocarbons (boiling range 184 to 210° C.) and trioctyl phosphate the epoxide content of the solution at a flow of 300 liters per hour increased daily on an average of 1.0 gram per liter with the simultaneous decrease of a corresponding amount of total quinone. The starting solution had 35 g./l. of 2-ethyl anthraquinone, 85 g./l. of 2-ethyl tetrahydroanthraquinone and a volume ratio of aromatic hydrocarbons to trioctyl phosphate of 74 to 26. At an epoxide content of 25 g./l. there was introduced into the cycle a tower containing 15 kg. of fresh $Al_2O_3$ (Table 1, column 1). Thereupon the epoxide content of the solution fell off strongly in the first 3 days of the test and then rose again in a time of 22 days to 25 g./l. Therefrom there was calculated an epoxide conversion value of 1.08 kg. epoxide/kg. $Al_2O_3$.

The $Al_2O_3$ tower was then changed because the $Al_2O_3$ was no longer in condition to change epoxide into quinone (quality of the used up $Al_2O_3$, Table 1, column 2).

EXAMPLE 2

The used up $Al_2O_3$ (see Example 1) was washed 6 times successively, each time for 1 hour at 70° C. with 30 liters of a 2% soda lye. Then it was washed 3 times with 30 liters of water each time and dried for 15 hours in a vacuum cabinet (140° C., 100 torr). The dried $Al_2O_3$ was inserted into the cycle and showed an epoxide conversion value of 0.8 kg. epoxide/kg. $Al_2O_3$.

EXAMPLE 3

15 kg. of used up $Al_2O_3$ (see Example 1) were subjected to the following operations at 70° C., each time with 15 liters of liquid in the space of 4 hours each time.

(a) 2 times washing with NaOH (2%), (b) 7 times washing with NaOH (0.5% with addition of 0.2 kg. $H_2O_2$ (50% aqueous)), (c) 3 times washing with water with addition each time of 0.2 kg. $H_2O_2$ (50% aqueous), (d) 2 times washing with acetone, however, at 20° C.

The $Al_2O_3$ was then blown off with steam, dried according to Example 2 and showed in the cycle an epoxide conversion value of 1.2 kg. epoxide/kg. $Al_2O_3$. From the combined and evaporated acetone extracts a solid organic substance was isolated which consisted of about 80% ethyl anthraquinone.

EXAMPLE 4

The $Al_2O_3$ regeneration was repeated according to Example 3 with the difference that the acetone washes were omitted. The $Al_2O_3$ had an epoxide conversion value of 1.1 kg. epoxide/kg. $Al_2O_3$ and also retained this value after repeated regenerations.

What is claimed is:

1. A process for the regeneration of aluminum oxide which has been used for purification and regeneration of the working solution in the anthraquinone process for the production of hydrogen peroxide and has become inactivated by such use consisting essentially of treating at a temperature below 100° C. the inactivated aluminum oxide with an aqueous alkaline solution providing a pH above 8 or said aqueous alkaline solution containing an active oxygen compound, and drying the treated aluminum oxide.

2. The process according to claim 1 wherein the inactivated aluminum oxide is treated successively with an alkaline solution and an active oxygen compound-containing aqueous alkaline solution.

3. The process according to claim 1 wherein the treatment is with an alkaline solution containing an active oxygen compound.

4. The process according to claim 3 wherein the treatment is carried out with a solution of soda lye and hydrogen peroxide.

5. The process according to claim 1 wherein the temperature is 40 to 90° C.

6. The process according to claim 1 wherein the alkaline solution has 0.1 to 3.0% of alkaline material and the treatment is carried out at 40–90° C.

7. The process according to claim 6 wherein the treatment is carried out with a sodium hydroxide solution containing hydrogen peroxide.

8. The process according to claim 1 wherein the alkaline solution has a temperature of 20 to 90° C.

9. The process according to claim 1 wherein the pH is above 10.

10. The process according to claim 1 wherein the aluminum oxide after regeneration is washed with a member of the group consisting of water and an organic solvent.

11. The process according to claim 1 wherein the aluminum oxide prior to the regeneration is treated with steam and after regeneration is washed with a member of the group consisting of water and an organic solvent.

12. The process according to claim 1 wherein the aluminum oxide prior to the regeneration is both washed with an organic solvent and treated with steam and after regeneration is washed with a member of the group consisting of water as an organic solvent.

13. The process according to claim 1 wherein the inactivated aluminum oxide is separated from the solution employed in the anthraquinone process prior to the treatment with alkaline solution.

References Cited

UNITED STATES PATENTS

| 2,378,155 | 6/1945 | Newsome et al. | 423—628 |
| 3,098,714 | 7/1963 | Käbisch et al. | 23—207 |
| 2,983,584 | 5/1961 | Sancelme | 23—207 |

FOREIGN PATENTS

| 1,259,309 | 1/1968 | Germany | 23—207 |

EDWARD J. MEROS, Primary Examiner

H. S. MILLER, Assistant Examiner

U.S. Cl. X.R.

423—628